United States Patent
Larsson et al.

(10) Patent No.: US 8,200,266 B2
(45) Date of Patent: Jun. 12, 2012

(54) METHOD FOR ALLOCATION OF COMMUNICATION PARAMETERS IN A MULTIUSER WIRELESS COMMUNICATIONS SYSTEM

(75) Inventors: Peter Larsson, Solna (SE); Mikael Prytz, Ronninge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 12/666,986

(22) PCT Filed: Jun. 29, 2007

(86) PCT No.: PCT/SE2007/050477
§ 371 (c)(1),
(2), (4) Date: Dec. 28, 2009

(87) PCT Pub. No.: WO2009/005421
PCT Pub. Date: Jan. 8, 2009

(65) Prior Publication Data
US 2010/0197331 A1 Aug. 5, 2010

(51) Int. Cl.
*H04Q 7/20* (2006.01)
(52) U.S. Cl. ..... 455/509; 455/508; 455/507; 455/67.11; 455/522; 455/69; 370/328; 370/329; 370/338; 370/345
(58) Field of Classification Search ........... 455/509, 455/508, 507, 511, 513, 515, 67.11, 500, 455/517, 68, 69, 127.1, 73, 426.1, 426.2, 455/91, 550.1, 422.1, 403, 414.1–414.4, 455/445, 522; 370/328, 329, 332, 338, 345, 370/340, 341
See application file for complete search history.

(56) References Cited

U.S. PATENT DOCUMENTS

2005/0002357 A1 * 1/2005 Hu et al. ............ 370/332
2007/0248048 A1 * 10/2007 Zhu et al. ............ 370/329

OTHER PUBLICATIONS

Munz, G. et al. "An Efficient Waterfilling Algorithm for Multiple Access OFDM." IEEE Global Telecommunications Conference, 2002 (GLOBECOM '02), Nov. 17-21, 2002, pp. 681-685.
Zeng, C. et al. "Efficient Water-filling Algorithms for Gaussian Multiaccess Channel with ISI." IEEE 52nd Vehicular Technology Conference, 2000 (VTC-Fall 2000), vol. 3, pp. 1072-1077.
Zeng, C. et al. "Optimal Water-filling Algorithms for a Gaussian Multiaccess Channel with Intersymbol Interference." IEEE International Conference on Communications, 2001 (ICC 2001), vol. 8, pp. 2421-2427.

* cited by examiner

*Primary Examiner* — Keith Ferguson
(74) *Attorney, Agent, or Firm* — Coats & Bennett, P.L.L.C.

(57) ABSTRACT

A method (400) for use in a wireless communications system, with a first transmitter (410) and (415) a first and a second user, and at least (420) first and second channels for the first transmitter to transmit to said two users on, which method uses a first Lagrange parameter $\lambda$. The method comprises: Defining (425) a parameter $q_{i,j}$, which represents the inverse channel quality for user $u_i$, and channel $j$, Finding (430) all channels for user $u_i$, such that $q_{ij} \leq \lambda_i$, but $q_{i'j} > \lambda$, $V_{i'} \neq i$, and designate those channels to user u, If more than one user u, with $q_{i'j} < \lambda$ for a channel j is found, then assign (435) that channel to the user $u_i$, that ensures the condition $q_{i,j}/q_{i'j} > \lambda_i/\lambda_{i'}$, $V_{i'} \neq i$. If $q_{i,j} > \lambda_i$, Vi then (430) leave channel j unassigned Power levels and rates may also be allocated with the aid of the invention.

14 Claims, 5 Drawing Sheets

METHOD FOR ALLOCATION OF COMMUNICATION PARAMETERS IN A MULTIUSER WIRELESS COMMUNICATIONS SYSTEM

TECHNICAL FIELD

The present invention discloses a method and a device for allocation of communication parameters in a communications system comprising one or more sets of one transmitter with multiple users, i.e. receivers, and at least one channel.

BACKGROUND

In transmitters in wireless communications systems, such as the transmitters in the base stations of cellular access systems, it is a desire to keep the power consumption low and to maintain energy efficient communication with the users in the cell or cells that is/are serviced by the base station. There are a number of reasons for this, among which the following can be mentioned:

- An operator who can reduce the power/energy consumption will become more cost-efficient, and thus yield increased revenue. The energy cost is generally considered to be a substantial part of the Operating cost.
- An operator may also be interested in offering the best (or, for the service, sufficient) performance to his customers in relation to the power/energy that is invested.
- Manufacturers are interested in reducing the power/energy consumption of base stations and other equipment, since that may lead to lower manufacturing costs due to fewer/smaller cooling components and power amplifiers, and will improve their competitiveness and sales margins due to lower manufacturing costs.
- Reduced energy/power consumption is also beneficial for solar panel driven base stations as it enables prolonged operation and/or increased range given an energy/power budget. This is of particular interest when enabling cellular services to future users, who often live in rural areas with little or no infrastructure, such as an electricity grid.
- An operator operating a system in remote areas which often lack distribution systems for electricity may often need to rely on fuel, e.g. often diesel, driven generators, and hence requires tedious and costly transport and management of this fuel. It would be desirable to reduce this problem by a more energy and power efficient design.
- More resource-efficient methods for communication are also of interest for society as a whole, given the climate change problem, and acknowledging that the source of electricity for most cellular systems is often based on non-renewable fossil fuel.

In addition, it is a generally good design philosophy to minimize energy consumption.

The so called "Water-filling" solution is a well known technique for power and rate allocation in a cellular wireless access system, when communicating over multiple carriers/channels with different gain to noise ratios, and provides the optimal performance, typically measured as the sum rate, for a given investment of sum power. The "water filling" solution provides power and rate allocation for each channel.

Consider a Gaussian vector channel with J orthogonal channels, each indexed with the letter j, where the noise-to-gain ratios $q_j = \sigma_j^2/G_j$ are known for all channels, and where $\sigma_j^2$ is the noise and interference power and $G_j$ is the channel gain. The problem is to determine the channel power allocations $P_j$ that maximizes the total (Shannon) rate over all channels subject to a constraint on total sum power $P^{(tot)}$:

$$\max \sum_{\forall j} R_j$$

$$s.t. \sum_{\forall j} P_j = P^{(tot)}$$

$$R_j = \log_2(1 + P_j G_j / \sigma_j^2)$$

$$P_j \geq 0$$

The term "s.t." in the equation above stands for "subject to", and indicates the constraint under which the optimization is performed. In this case, the optimization is a maximization of the sum rate for each channel j. $R_j$ stands for the maximum permissible communication rate. The rate here is synonymous with channel capacity in b/Hz/s.

$P_j^*, R_j^*$ are the solutions to the above optimization problem according to $$P_j^* = \begin{cases} \lambda - \sigma_j^2/G_j, & \text{if } \lambda > \sigma_j^2/G_j \\ 0, & \text{Otherwise} \end{cases}$$

$$R_j^* = \log_2(1 + P_j^* G_j / \sigma_j^2)$$

where $\lambda$ is a so called Lagrange parameter which is tuned to fulfil the condition that all the transmit powers add up to a total power $P_{tot}$.

In wireless communications systems, such as cellular access systems, the transmitter, for example in a base station, generally has the task of assigning resources, such as channels and rates, for communication with users of the system, as well as assigning suitable power and rates.

Since a base station may communicate with multiple users, especially in multicarrier systems such as OFDMA systems exemplified by LTE (i.e. 3GPP's Long Term Evolution), IEEE 802.16 and others, the classical water-filling solution is interesting, but is insufficient since it does not address the existence of multiple users. Other examples of multi carrier systems are SC-FDMA systems. (SC-FDMA: Single Carrier Frequency Division Multiple Access).

Commonly in wireless access systems, channel assignment is treated separately from power and rate control, i.e. the system first selects channels, and then, independently, assigns power and rates. Moreover, while there are examples where power and rate are jointly adapted, it is common in practice that the system either roughly tries to use a fixed power level with adaptive rate (HSDPA in 3GPP's WCDMA) or fixed rate with adaptive power (DCH for WCDMA in 3GPP's WCDMA, or DCH in GSM).

Nevertheless, the problem of dealing with multiple users and assigning powers and rates simultaneously has been addressed in various forms. However, in general, existing solutions do not provide for a simple, and a flexible framework which is adaptive to different and/or changing power and rate constraints, both on a system and individual user level.

SUMMARY

Thus, as has been explained above, in a wireless communications system such as a cellular wireless access system, there is a need to find a more structured way than hitherto known to solve the problem of letting a transmitter, such as a transmitter in a base station, select users and which channels they should communicate on, as well as the output power and rates that should be used.

In addition, there is a need for a method by means of which it would be possible to jointly determine channel allocation, power and rates for a single transmitter to multiple users in a multi-channel system where channels offer different communication qualities.

These needs are addressed by the present invention in that it discloses a method for use in a wireless communications system, such as a cellular wireless access system, in which there is at least a first transmitter and at least a first and a second receiver, i.e. users that are associated with the first transmitter, and at least a first and a second channel for said at least first transmitter to transmit to said at least two users on.

The method of the invention uses at least a first Lagrange parameter $\lambda$, and the method comprises the following:

Define a parameter $q_{i,j}$, which represents the inverse channel quality for user $u_i$ and channel j, Find all channels for user $u_i$ such that $q_{i,j} \leq \lambda_i$ but $q_{i',j} > \lambda_{i'}$, $\forall i' \neq i$, and designate those channels to user $u_i$.

If more than one user $u_i$ with $q_{i,j} \leq \lambda_i$ for a channel j is found, then assign that channel to the user $u_i$ that ensures $q_{i,j}/q_{i',j} > \lambda_i/\lambda_{i'}$, $\forall i' \neq i$.

If $q_{i,j} > \lambda_i$, $\forall i$, channel j is left unassigned.

Suitably, according to the method of the invention, the inverse channel quality parameter $q_{i,j}$ for user $u_i$ and channel j is defined as $q_{i,j} = \sigma_{i,j}^2/G_{i,j}$, where $G_{i,j}$ is the channel gain and the receiver noise and interference power in the receiver is $\sigma_{i,j}^2$.

Thus, as will become even more evident from the following detailed description of the invention, the present invention offers a flexible, low complexity optimization framework for jointly determining user-specific channel allocations to the different users in the system, as well as output power and rates, based on Lagrange parameters and on channel qualities, with a specific, Lagrange based, channel allocation criteria In addition, the present invention also offers joint multi-user opportunistic channel dependent scheduling and "water-filling, with the possibility to efficiently exploit time or frequency fluctuating channel qualities due to fading or varying interference situation In addition, the present invention further enables the mixing of user individual sum-power and sum-rate constraints, while optimizing a common objective function for all users.

BRIEF DESCRIPTION OF THE DRAWINGS

The invention will be described in more detail in the following, with reference to the appended drawings, in which.

DETAILED DESCRIPTION

Figure 1:
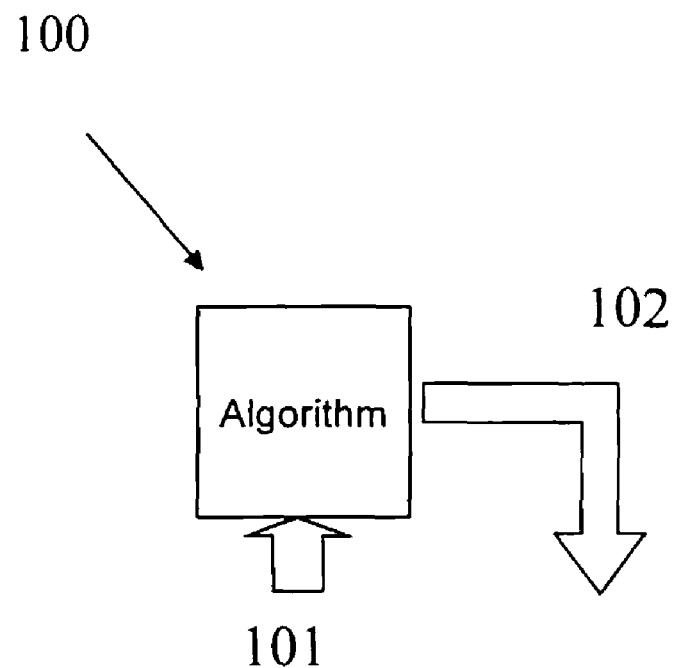
FIG. 1 shows a basic method of the invention.

The present invention will now be described in more detail below, with some algorithms being shown. It should be noted that although the present invention is derived in a heuristic manner, it has a true optimization foundation as it to some extent takes the classical "water-filling solution" as its starting point. The "water-filling solution" and an exact solution approach are described in detail at the end of this text, for those readers who seek specific details on those methods.

As mentioned previously, the present invention is aimed at an application in a wireless communications system, where the problem is to allocate channels, output power and rates in communication from a sending party such as a base station to a receiving party such as a user with a mobile terminal in the system.

Assume the following:
1 transmitter,
$I \geq 2$ receivers, e.g. users of the system, and
$J \geq 2$ channels,
where:
Each channel for user $u_i$ is characterized by its channel gain $G_{i,j}$, and the corresponding receiver noise and interference is $\sigma_{i,j}^2$. For brevity, define $q_{i,j} = \sigma_{i,j}/G_{i,j}$, where $q_{i,j}$ represents the inverse channel quality for user $u_i$ and channel j.

The problem is now to determine the channel allocation, which is done in the following manner:

Channel allocation
For each user $u_i$, the set of channels to be used, if any, are determined.
The set of channels to be unused, if any, are determined.
The determination is based on $q_{i,j}$s and a set of Lagrange parameters $\lambda_i$s, where each $\lambda_i$ may potentially be user $u_i$ specific, see details below.

Specifically, the channel allocation rule proposed by the present invention is as follows:
Find all channels for user $u_i$ such that $q_{i,j} \leq \lambda_i$, but $q_{i',j} > \lambda_{i'}$, $\forall i' \neq i$, and designate the set of channels to user $u_i$.
In the event that there are multiple user $u_i$ with $q_{i,j} \leq \lambda_i$ for a channel J, assign the user $u_i$ that ensures $q_{i,j}/q_{i',j} > \lambda_i/\lambda_{i'}$, $\forall i' \neq i$.
In the event that $q_{i,j} > \lambda_i$, $\forall i$, channel j is left unassigned.

The invention may also be used for power and rate allocation in the following manner:

Power allocation:
For each user $u_i$ and the selected set of channels to be used, if any, the power allocation is determined based on the "water-filling" solution, that is, the determination is based on $q_{i,j}$s and a set of Lagrange parameters $\lambda_i$s, which may potentially be user $u_i$ specific.

Rate allocation:
For each user $u_i$ and the selected set of channels to be used, if any, the rate allocation is determined based on the "water-filling" solution, that is, the determination is based on $q_{i,j}$s and a set of Lagrange parameters $\lambda_i$s which may potentially be user $u_i$; specific.

In all, the above specifies a specific mapping from a set of Lagrange parameters for each user (here assembled in a vector $\lambda$), a matrix Q with elements $q_{i,j}$ indicative of the inverse channel quality for user i and channel j, a matrix R with elements $R_{i,j}$ indicative of the rate for user i and channel j, a matrix P with elements $P_{i,j}$ indicative of the power for user i and channel j. Only one user may be allocated a power and rate, so the matrices R and P also indicate the how channels are allocated among users. The mapping is hence $f(\lambda, Q) \rightarrow \{R, P\}$. In this formulation, users that are not allocated a channel will have a zero rate and a zero power. At most, and if the channel is not unused, only one user is allocated to a channel, and then using non-zero power and non-zero rate. To complement this description, where the channel allocation is implicit in the matrices R (or P) with the non-zero elements, and to show more explicitly that users are allocated channels, a channel allocation vector C with the respective user for each channel may be defined. An example of a channel allocation vector could take the form $c = \{u_4, u_3, u_9, u_1 \ldots, -, u_1, u_9\}$, which illustrates that each channel is assigned a user $u_i$, or is unused, the latter indicated with the symbol "-", i.e. a hyphen.

Also note that the interference included in $\sigma^2_{i,j}$ could arise from any other source, such as one or more similar arrangements of the invention, i.e. one or more sets with a sender that is in communication with a set of user, wherein the sender assign channels, power levels and rates according to the invention. Whenever, as illustrated below, an iterative determination of channel, power level and rate allocations for the users is used, the interference level may vary for each iteration round.

A few words can be added regarding the Lagrange parameters: this is a parameter that arises in optimization problems when solved with Lagrange's optimization method. The Lagrange parameter is tuned to fulfill some condition under which the optimization is performed.

Returning now to the channel allocation rule of the invention, and the test of $q_{i,j}/q_{i',j} > \lambda_i/\lambda_{i'}$, $\forall i' \neq i$, only the set of users for which $q_{i,j} \leq \lambda_i$ is valid need to be tested. Also, only the "surviving" user of the test $q_{i,j}/q_{i',j} > \lambda_i/\lambda_{i'}$, $\forall i' \neq i$ needs to be tested against the next untested user for the considered channel. Hence, the complexity can be kept fairly low.

FIG. 1 shows the overall system architecture of a method 100 of the invention, and pictorially shows how the method or algorithm 100 may be used to find the optimal user-channel allocation the transmitter output power levels and/or rates $R_{i,j}$ based on Lagrange parameter inputs $\lambda_i$ for user $u_i$ as described above. The input "101" to the algorithm 100 is thus $\lambda_i$, $\forall i$, and the output 102 is $P_{i,j}$ and $R_{i,j}$; $\forall i,j$.

Figure 2:
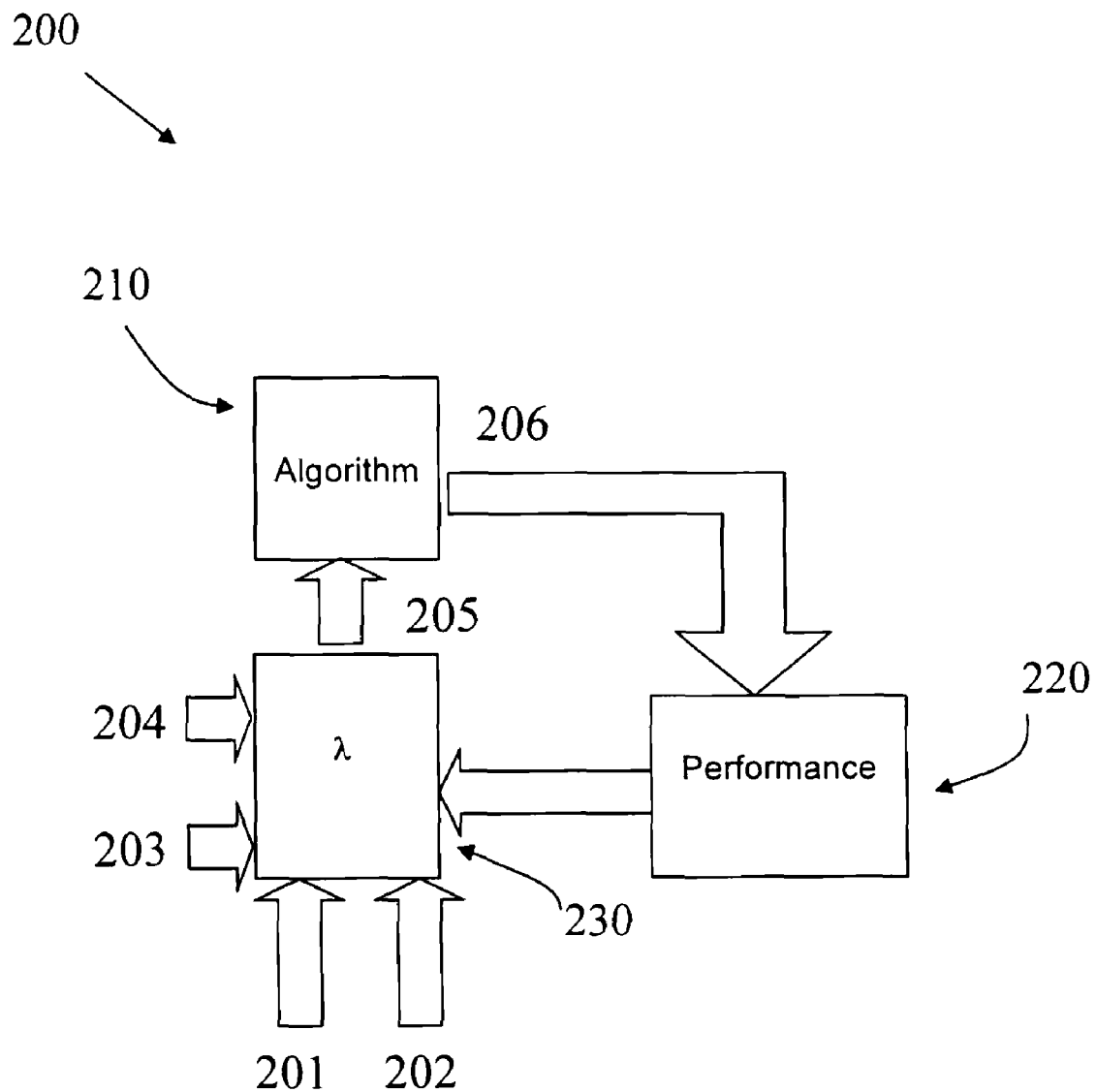
FIG. 2 shows a version of the method of FIG. 1.

FIG. 2 shows another possible version 200 of the method of the invention, where the same parameters, i.e. $P_{i,j}$, $R_{i,j}$ are determined, but now with an iterative approach in order to fulfil the sum optimization problem with a sum rate and/or power constraint or a set of rate and/or power individual constraints.

In more detail, the method 200 illustrated in FIG. 2 comprises an algorithm 210 which is basically the same as the algorithm of FIG. 1, but the method 200 also comprises a $\lambda_i$ calculator 230 for all users $u_i$, which is used in order to find a new set of $\lambda_i$s, shown as 205 in FIG. 2, based on the following input values, as shown by the input arrows numbered as 201, 202, 203 and 204 in FIG. 2:

201: a tolerance input $T_j$, which measures the deviation from the calculated performance against the desired performance constraints for each channel, i.e. $T_j$; $\forall j$.

202: the initial values for the Lagrange parameters, i.e. $\lambda_i^{(start)}$ for each user $u_i$, mathematically expressed as $\lambda_i^{(start)}$; $\forall i$.

203: the sum parameter to optimize, i.e. the sum of all rates or the sum of all output power levels. Nota bene, only one parameter, the rate or the power, may be selected as the sum parameter to be optimized. Mathematically, this can be expressed as:

$$\min \sum_{\forall j} \sum_{\forall i} P_{i,j}$$

or $\forall i, j$ $$\max \sum_{\forall j} \sum_{\forall i} R_{i,j}$$

204: the sum rate and/or power constraint $P^{(tot)}$ and $R^{(tot)}$, or an individual per user power and/or rate constraints, $P_i^{(tot)}$ and $R_i^{(tot)}$, which mathematically can be expressed as:

$P^{(tot)}$ or $R^{(tot)}$; $\forall i$ or $P_i^{(tot)}$ and/or $R_i^{(tot)}$; $\forall i$ the estimated performance values from the previous iteration round, The output 205 of the algorithm block 210 can also be expressed as $\lambda_i^{(n)}$; $\forall i$.

Based on the set of $\lambda_i$s, the algorithm block 210 determines the $(n+1)^{th}$ iteration of transmitter output power level, the rate and user-channel allocations, shown as the output 206 $P_{i,j}^{(n+1)}$, $R_{i,j}^{(n+1)}$ from the algorithm block. The output 206 can also be expressed mathematically as:

$$P_{i,j}^{(n+1)} \text{ and } R_{i,j}^{(n+1)} \forall i, j$$

$$\begin{pmatrix} \text{if } P_{i,j}^{(n+1)} \neq 0 \text{ then } P_{i',j}^{(n+1)} \neq 0, \forall i' \neq i \text{ and} \\ R_{i,j}^{(n+1)} \neq 0 \text{ then } R_{i',j}^{(n+1)} \neq 0, \forall i' \neq i \end{pmatrix}$$

The method 200 also comprises a performance calculator 220, "Performance", which uses the output values $P_{i,j}^{(n+1)}$, $R_{i,j}^{(n+1)}$ from the algorithm 210 in order to estimate the sum performance for all users, as well as relevant performance measures that relate to sum rate and/or power constraint, or the individual per user power and/or rate constraints. The performance measure is determined based on the sum maximization input to the $\lambda_i$ calculator. If the sum power (i.e. the sum over all users and channels) is to be optimized, then the sum power is used as the performance measure, and likewise for the rate.

The Lagrange parameters $\lambda_i$ maybe determined within the scope of the present invention using various strategies, which enable different optimization objectives to be achieved. Examples of such strategies are given below:

Different and independent $\lambda_i$s may be used, in order to fulfil independent per user link optimization with per user link constraints. This can for example solve the problem $$\max \sum_{\forall j} R_{i,j}$$

$$\text{s.t.} \sum_{\forall j} P_{i,j} = P_i^{(tot)}$$

or the problem $$\min \sum_{\forall j} P_{i,j}$$

$$\text{s.t.} \sum_{\forall j} R_{i,j} = R_i^{(tot)}$$

Coupled $\lambda_i$s may be used, in order to fulfil interdependent system optimization with system or per user link constraints, with the following sub cases:

Identical $\lambda_i$s are used, which implies system constraints. This can solve the problem:

$$\max \sum_{\forall j} \sum_{\forall i} R_{i,j}$$

$$\text{s.t.} \sum_{\forall j} \sum_{\forall i} P_{i,j} = P^{(tot)}$$

or the problem $$\max \sum_{\forall j} \sum_{\forall i} P_{i,j}$$

-continued $$\text{s.t.} \sum_{\forall j} \sum_{\forall i} R_{i,j} = R^{(tot)}$$

Proportional scaling of $\lambda_i$s may be used, i.e. $\lambda_i$s is used, i.e. $\lambda_i = x\lambda_i^0$, $\lambda_{i'} = x\lambda_{i'}^0$, where $\lambda_i^0 \neq \lambda_{i'}^0$ is allowed, and where $\lambda_i^0 = E\{q_{i,j}\}$. This enables opportunistic (channel dependent) scheduling in fading channels that also incorporate power and rate allocation through waterfilling. From an opportunistic scheduling point of view, using $\lambda_i^0 = E\{q_{i,j}\}$ is equivalent to a proportionally fair scheduler criterion according to $$\hat{i} = \underset{\forall i}{\text{argmax}}\{q_{i,j}/\overline{q}_{i,j}\}$$

The above operations, with the various constraints implied, may further be supplemented with means for adapting the Lagrange parameters, such that:
  Constraints are fulfilled, including:
    Power and rate constraints
    Sum (i.e. over all users) and per users constraints
  Note that when a rate based optimization is performed, one should maximize the measure, whereas for the power based optimization, the power is minimized.

Figure 3:
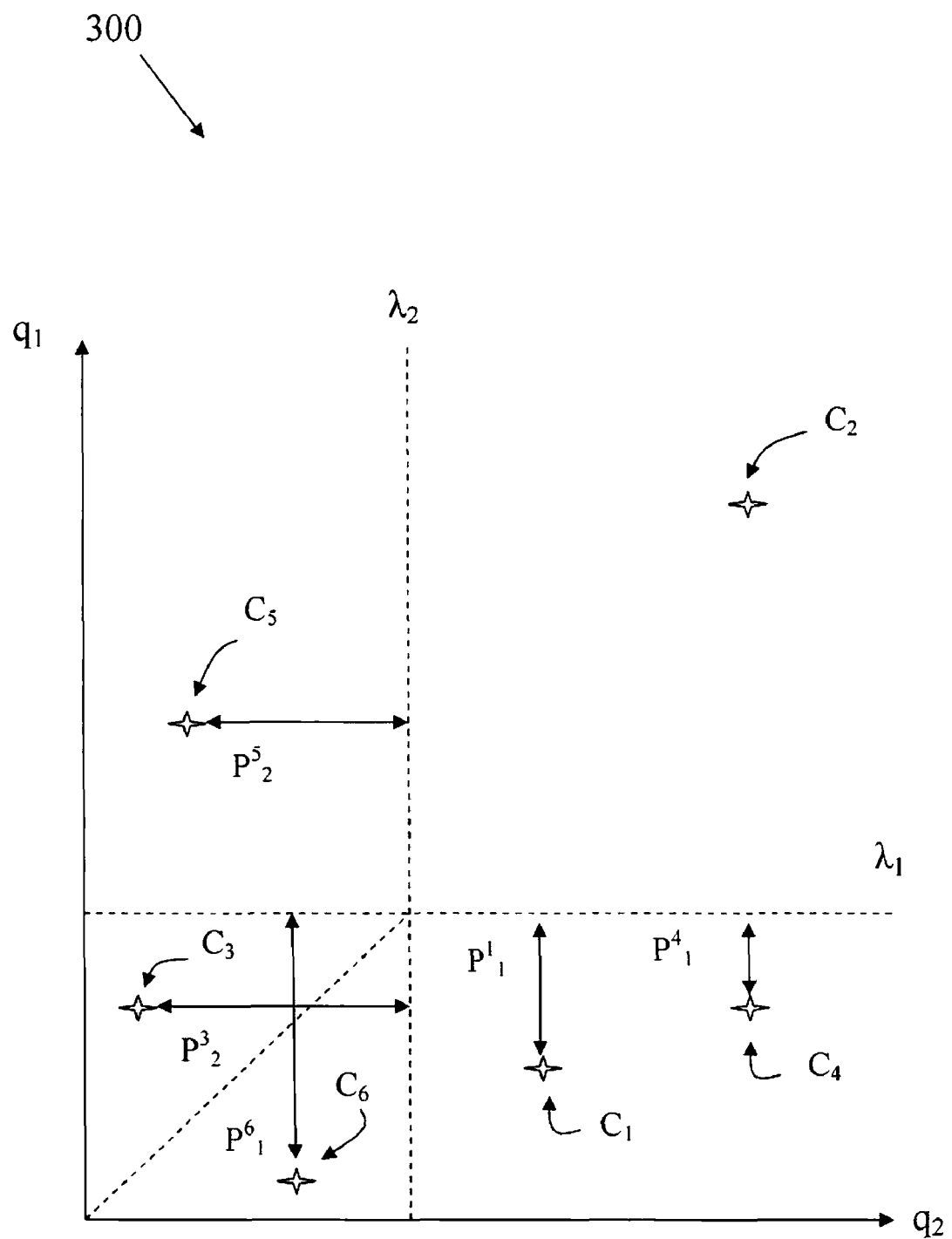
FIG. 3 shows a graphic representation of the invention.

The method of the invention can also be shown by means of a graphic visualization, which is shown in the graph 300 FIG. 3. FIG. 3 shows a two-user case with six channels $C_1$ to $C_6$. The vertical and the horizontal axes show the inverse quality for user one, $q_1$, and two, $q_2$, respectively. Each of the six channels is shown in the graph as a cross, and dotted lines represent the Lagrange parameters $\lambda_1$ and $\lambda_2$ for the respective user $u_1$ and $u_2$. The lines represented by the Lagrange parameters $\lambda_1, \lambda_2$ may be seen as delineating respective "allocation areas" for the channels $C_1$ to $C_6$ in the graph, with the channel assignments being shown by means of straight lines from the cross which represents a channel to one of the Lagrange parameters $\lambda_1$ or $\lambda_2$. As can be seen, channel 2, i.e. $C_2$, is not assigned to either of the two users in the example, since that channel is not inside either of the allocation areas. The term "not inside", as can be realized from FIG. 3, means that channel 2 does not have a $q_i$ value which is lower than either of the Lagrange parameters $\lambda_1$ or $\lambda_2$.

As can also be seen from the graph in FIG. 3, channels 1, 4, and 6 are assigned to user 1, since they are inside the allocation area defined by $\lambda_1$, and channels 3 and 5 are assigned to user 2.

FIG. 3 also shows a line from the origin, i.e. (0, 0), to the crossing point between the lines of the two Lagrange parameters $\lambda_1$ and $\lambda_2$. This line from (0, 0)→($\lambda_1$, $\lambda_2$) is the border between the two user allocation regions. As can also be seen, there is a potential "conflict area" for channels which are inside the allocation areas of both users, i.e. channels which are below the line defined by $\lambda_1$ but also to the left of the line defined by $\lambda_2$. Allocation conflicts, such as those in the case of channels 3 and 6 of FIG. 3 are resolved using the rule of $q_{i,j}/q_{i',j} > \lambda_i/\lambda_{i'}$, $\forall i' \neq i$. As an example of how this rule is applied, take channel 3, i.e. $C_3$:

$$q_{1,3}/q_{2,3} > \lambda_1/\lambda_2$$

Channel 3 is thus allocated to user 2, which is shown by means of a straight line from the cross of channel 3 to $\lambda_2$. In a similar manner, channel 6 is allocated to user 1, $\lambda_1$. The rule which was used for allocating channel inside the "conflict area" can also be seen as follows: a line may be imagined form the origin (0,0) to the cross which indicates the channel. If the slope of this line is steeper than the slope of the line from the origin to the cross of $\lambda_1/\lambda_2$, the channel will be allocated to user 1, $\lambda_1$, otherwise the channel will be allocated to user 2, $\lambda_2$.

The line from the cross of a channel to the Lagrange line, which indicates the channel which user is allocated to, may also be seen as an indicator of the output power to be used for that channel to that user. Thus, for example, the line from channel 5 is shown as $P_2^5$, which indicates not only that channel 5 will be used for user 2, but the length of the arrow also indicates the output power that may be used for channel 5.

Writing out the channel allocation vector for FIG. 3 gives $c = \{u_1, -, u_2, u_1, u_2, u_1\}$.

The graph 300 of FIG. 3 only shows a two user case, which is for reasons of clarity and ease of explanation and the reader's understanding of the invention, but the method can be straightforwardly extended to any I-user case, where $I \geq 2$.

With continued reference to FIG. 3, a few aspects on optimization and what is optimized will now be discussed.
  When different and independent $\lambda_i$s are used, one realizes that if no channels are situated in an allocation region common to multiple users, the optimization will be per user, and the constraint is per user. However, for any channel that resides in an allocation region common to multiple users, it is not immediately evident which user that channel should be allocated to. Yet, as soon as a channel is allocated to any one user, classical single user water-filling gives the optimal power and rate allocation. In choosing one user, among multiple users, for the channel, one connects the optimization parameter and gets a common function.
  When coupled and identical $\lambda_i$s are used, it can be seen that the optimization is system oriented, i.e. over all users and channels, and with a system related constraint. The bordering line between user allocation areas represents the same rate allocation for a channel, lying on the line, regardless of which user it is allocated to. Hence, the condition $q_{i,j}/q_{i',j} > \lambda_i/\lambda_{i'}$, $\forall i' \neq i$ ensures that a channel will be allocated to the user which uses the least power.

The invention also allows for a mixture of power and rate constraints, apart from having a sum power or a sum rate constraint (over all users and channels), i.e. one user may have a rate constraint, whereas another user has a power constraint. The constraint should be seen as the sum of power (or rate) that a user should achieve over all its assigned channels.

Figure 4:
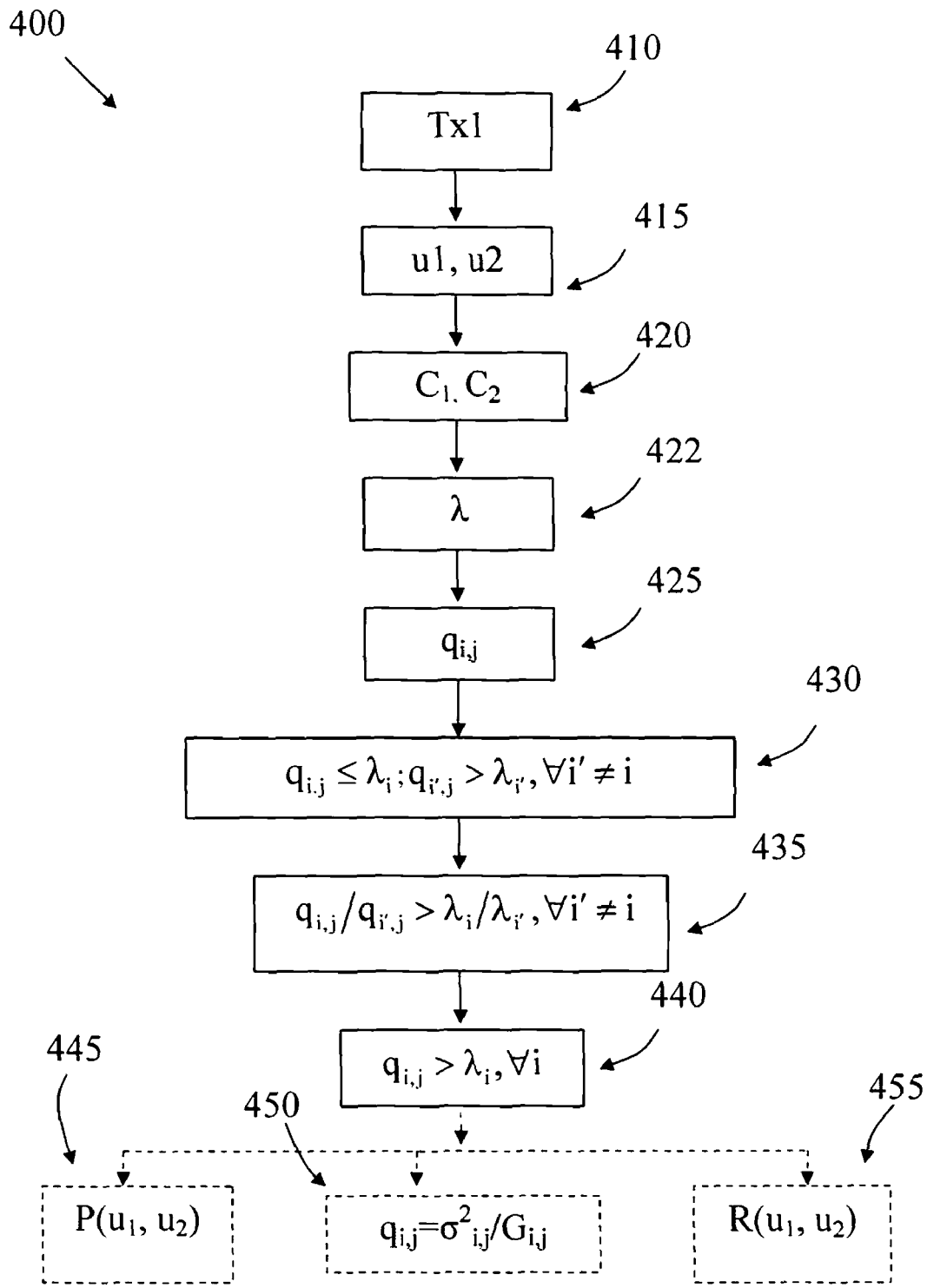
FIG. 4 shows a basic flow chart of a method of the invention.

FIG. 4 shows a schematic flowchart 400 of a method of the invention. Steps which are options or alternatives are shown with dashed lines. As indicated in step 410 of FIG. 4, the method comprises using at least a first transmitter, and as shown in step 415, at least a first and a second receiver, i.e. users, and at least, step 420, a first and a second channel for said at least first transmitter to transmit to said at least two users on.

As described previously in this text, the method 400 uses at least a first Lagrange parameter $\lambda$ per user, as shown in step 422, and comprises the following:
  Define, step 425, a parameter $q_{i,j}$, which represents the inverse channel quality for user $u_i$ and channel j,
  Find, step 430, all channels for user $u_i$ such that $q_{i,j} \leq \lambda_i$ but $q_{i',j} > \lambda_{i'}$, $\forall i' \neq i$, and designate those channels to user $u_i$.
  If more than one user $u_i$ with $q_{i,j} \leq \lambda_i$ for a channel j is found, then assign, step 435, that channel to the user $u_i$ that ensures the condition $q_{i,j}/q_{i',j} > \lambda_i/\lambda_{i'}$, $\forall i' \neq i$.
  If $q_{i,j} > \lambda_i$, $\forall i$, then, step 440, leave channel j unassigned.

As is indicated in step 450, the inverse channel quality parameter $q_{i,j}$ for user $u_i$ and channel j is defined as $q_{i,j} = \sigma^2_{i,j}/G_{i,j}$, where $G_{i,j}$ is the channel gain and the receiver noise and interference power in the receiver is $\sigma^2_{i,j}$.

As shown in steps 445 and 455, the output power(s) P and rate(s) R for the first transmitter to said first $u_1$ and second $u_2$ receivers on channel j is also determined using $q_{i,j}$ and a set of Lagrange parameters $\lambda_i$.

Figure 5:
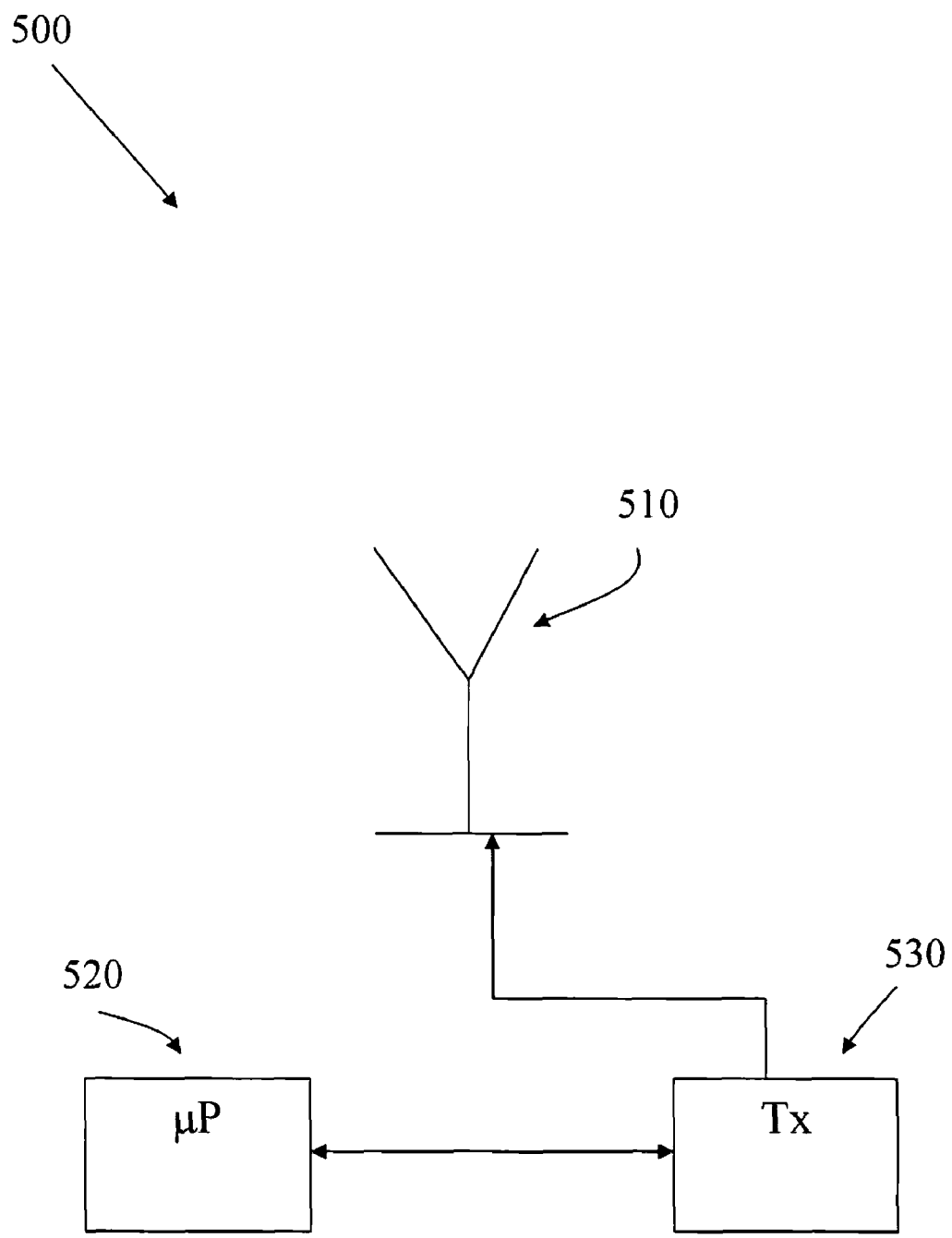
FIG. 5 shows a schematic block diagram of a transmitter of the invention.

FIG. 5 shows a rough block diagram of a transmitter 500 according to the present invention. As indicated in FIG. 5, the transmitter 500 may comprise an antenna 510, or means for being connected to such an antenna. In addition, the transmitter 500 will comprise transmit means, Tx 530, as well as a control function or control means, suitably a microcomputer 520 or some other form of processor.

The control means 520 will serve to control the transmitter 500 in the various ways described above and shown in FIGS. 1-4.

The transmitter of the invention, as described above, and as exemplified by the transmitter of FIG. 5, may be a transmitter in more or less any wireless communications system. However, applications which may be mentioned are transmitters in base stations in cellular communications systems, such as for example, OFDMA systems, as exemplified by LTE (i.e. 3GPP's Long Term Evolution) and IEEE 802.16. Other examples of cellular systems in which the invention may be applied are SC-FDMA systems. (SC-FDMA: Single Carrier Frequency Division Multiple Access)

The invention is not limited to the examples of embodiments described above and shown in the drawings, but may be freely varied within the scope of the appended claims.

Also, in the following, some of the mathematical background to the invention will be given.

Single User Power Allocation on a Gaussian Vector Channel

This section contains, for reference, a derivation of the so called water-filling solution to the (single-user) power allocation problem. The derivation is not required for the invention, but serves to illustrate the origin of "water levels" in the context of power allocation in communication networks.

Consider a Gaussian vector channel with J orthogonal channels where the noise-to-gain ratios $q_j = \sigma_j^2/G_j$ are known for all channels. The problem is to determine the channel power allocations $P_j$ that maximizes the total Shannon rate over all channels subject to a constraint on the total sum power $P^{(tot)}$:

(P-SU):

$$\max \sum_{j=1}^{J} \log\left(1 + \frac{P_j}{q_j}\right)$$

$$s.t. \sum_{j=1}^{J} P_j \leq P^{(tot)}$$

$$P_j \geq 0$$

$$j = 1, K, J$$

P-SU is a convex non-linear programming (NLP) problem since it is a maximization problem with a concave objective function (sum of concave functions) and convex constraints. The feasible set clearly also contains interior points (when $P^{(tot)} > 0$) so Slater's constraint qualification condition is fulfilled. Hence, the first-order KKT (Karush-Kuhn-Tucker) conditions are necessary and sufficient for optimality.

Now, form the Lagrangian:

$$L(P, \lambda, \mu) = \sum_{j=1}^{J} \log_2(1 + P_j/q_j) - \lambda\left(\sum_{j=1}^{J} P_j - P_{tot}\right) + \sum_{j=1}^{J} \mu_j P_j$$

The KKT conditions can be stated as:

$$(\nabla_P L(\bar{P}, \bar{\lambda}, \bar{\mu}))_j = \frac{1/q_j}{1 + \bar{P}_j/q_j} - \bar{\lambda} + \bar{\mu}_j = 0, \; j = 1, K, J, \quad \text{(i)}$$

$$\bar{\lambda}, \bar{\mu} \geq 0, \quad \text{(ii)}$$

$$\bar{\lambda}\left(\sum_{j=1}^{J} \bar{P}_j - P_{tot}\right) = 0, \quad \text{(iii)}$$

$$\bar{\mu}_j \bar{P}_j = 0, \quad \text{(iv)}$$

$$j = 1, K, J.$$

In addition the primal feasibility constraints need to be satisfied:

$$\sum_{j=1}^{m} \bar{P}_j \leq P_{tot}, \quad \text{(v)}$$

$$\bar{P}_j \geq 0, \quad \text{(vi)}$$

$$j = 1.K.J.$$

Assume first $\Sigma_{j=1}^{J} \bar{P}_j < P_{tot}$. Then (iii) gives $\bar{\lambda}=0$ and (i) yields $1=-\bar{\mu}_j(\bar{P}_j+q_j)$, which is infeasible since $\bar{P}_j \geq 0$, $\bar{\mu}_j \geq 0$ by (ii) and (vi), and $q_j > 0$. Hence $\Sigma_{j=1}^{J} \bar{P}_j = P_{tot}$ and $\bar{\lambda} > 0$. Next, assume $\bar{P}_j > 0$. Then $\bar{\mu}_j = 0$ by (iv) so (i) gives us $1 = \bar{\lambda}(\bar{P}_j + q_j)$, which after substitution of $\bar{\lambda}' = 1/\bar{\lambda}$ gives:

$$\bar{P}_j = \bar{\lambda}' - q_j.$$

That is, if power is allocated to channel j then it should be equal to the difference between a certain "water"-level $\bar{\lambda}'=1/\bar{\lambda}$ minus the noise-to-gain value for this channel. The value of the "water"-level $\bar{\lambda}'$ can be derived from the equality required in (v):

$$\sum_{j=1}^{J} \bar{P}_j = \sum_{j:\bar{J}} \bar{\lambda}' - q_j = \bar{\lambda}|\bar{J}| - \sum_{j:\bar{J}} q_j = P_{tot},$$

where $\bar{J} = \{j: \bar{P}^j > 0\}$ is the set of channels with positive power allocated. Reshuffling yields:

$$\bar{\lambda}' = \frac{P_{tot} + \sum_{j:\bar{J}} q_j}{|\bar{J}|}.$$

Since $\bar{P}_j = \bar{\lambda}' - q_j$, a channel j can be given positive power $\bar{P}_j > 0$ if and only if all channels $\hat{j}$ with $q_{\hat{j}} < q_j$ have been given positive power $\bar{P}_{\hat{j}} > 0$. This observation leads to the following scheme to determine $\bar{\lambda}'$:

1. Sort the channels in increasing values of $q_j$.
2. Add the first channel to $\bar{J}$, compute $\bar{\lambda}'$.
3. Try to add the next channel $\hat{j}$ to $\bar{J}$, compute updated $\bar{\lambda}'$.

4. If $\bar{\lambda}' > \hat{q}_j$ then keep $\hat{j}$ in $\bar{J}$ and go to 3, otherwise stop.

The output power levels are then finally allocated as $\bar{P}_j = \bar{\lambda}' - q_j$ for $\hat{j}$ in $\bar{J}$.

Exact Solution Approaches to the Multi-User Joint Channel, Power and Rate Allocation Problem The general multi-user joint channel, power and rate allocation problem with individual rate and power constraints, i.e. the problem addressed by the present invention, can be posed as the following optimization problem:

(P-MU):

$$\max \sum_{i=1}^{I} \sum_{j=1}^{J} x_{i,j} \log(1 + P_{i,j}/q_{i,j})$$

$$\text{s.t.} \sum_{i=1}^{I} \sum_{j=1}^{J} P_{i,j} \le P_{tot}$$

$$\sum_{j=1}^{J} \log(1 + P_{i,j}/q_{i,j}) \ge R_{i,min} \quad \forall i \in I^R$$

$$\sum_{j=1}^{J} P_{i,j} \le P_{i,max} \quad \forall i \in I^P$$

$$\sum_{i=1}^{I} x_{i,j} \le 1 \quad \forall j$$

$$P_{i,j} \ge 0 \quad \forall i, \forall j$$

$$x_{i,j} \in \{0, 1\} \quad \forall i, \forall j$$

As above the J channels are orthogonal and the noise-to-gain ratios $q_{i,j} = \sigma_{i,j}^2/G_{i,j}$ are known for all combinations of channels and the I users. The binary variables $x_{i,j}$ indicate if channel j is used for user i ($x_{i,j}=1$) or not ($x_{i,j}=0$) whereas the continuous variables $P_{i,j}$ is the power allocated to channel j for user i. The first constraint limits the total sum power to $P_{tot}$, the second and third are user-individual rate and power constraints for some subsets of users $I^R$, $I^P$, and the fourth constraint states that at most one user can be allocated to a given channel. The problem is to determine x and P such that the total Shannon rate over all channels is maximized.

P-MU is an integer nonlinear programming (I-NLP) problem, and is related to the single-user power allocation problem for which the optimal solution is known and can be computed very efficiently, as shown above under the heading "Single user power allocation on a Gaussian vector channel".

If the individual power and rate constraints are removed, it is straightforward to find the structure of the optimal solution. Suppose power is allocated to a channel for a particular user in a given feasible solution, and another user has a lower $q_{i,j}$ on this channel, then an improved feasible solution can be obtained by simply reassigning the channel to the other user using the same power. Hence, a strategy to solve P-MU is to first assign channels to users in a "greedy" fashion, i.e. with minimal $q_{i,j}$ for all I, as described by the invention, and to then apply "water-filling" on the resulting set of power variables.

The "greedy" solution strategy described above does not work in general for P-MU. One tool for devising practical algorithms for the general P-MU is to analyze it using exact optimization algorithms. These exact algorithms are likely not of interest in practice for the problem, but may serve as guidelines for practical schemes and can give bounds on performance.

Exact algorithms for integer programs are often based on so called "branch-and-bound" schemes. To demonstrate the structure of such a method, it is applied to the P-MU problem without the individual rate and power constraints, in spite of the "greedy" method described above.

First note that if the fourth (logic) constraint is removed from P-MU, and all the binary variables are set to one, then the remaining problem can be seen as a single-user power allocation problem on an I·J vector channel. The solution to this "relaxed" problem is easily found using the "water-filling" scheme described above. However, the solution may be infeasible for P-MU, that is, it violates the removed constraint, and allocates power to multiple users on the same channel.

A feasible solution and a lower bound can be created from each infeasible solution by a "greedy" heuristic solution, where the user that was given the highest rate on a particular channel takes over all power assigned to that channel, while still respecting the total power limitation. Branching can be done on the entire logic constraint, since it is a so called special ordered set of type 1, instead of individual binary variables, and may be limited to the most "promising" variables, e.g. highest rates, in an infeasible solution.

For the general P-MU case with individual rate and/or power constraints, the same approach can be applied. The relaxation problems are then no longer simple "water-filling" problems, but can be solved either by using a general solver for non-linear problems or by "water-filling" strategies for constrained power allocation problems.

The invention claimed is:

1. A method for use in a wireless communications system in which there is at least a first transmitter and at least a first and a second receiver as at least two users, and at least a first and a second channel for said at least first transmitter to transmit to said at least two users on, wherein the method uses at least two parameters lambda_i ($\lambda_i$), and comprises:

defining a parameter $q_{i,j}$, which represents the inverse channel quality for user $u_i$ and channel j;

setting lambda_i ($\lambda_i$) to be proportional to q_i, i.e., $\lambda_i = x\_i * E(q\_i)$, where x_i is a fixed or slowly changing parameter for user i;

finding all channels for user $u_i$ such that $q_{i,j} \le \lambda_i$ but $q_{i',j} > \lambda_{i'}$, $\forall i' \ne i$, and designating those channels to user $u_i$;

if more than one user $u_i$ with $q_{i,j} \le \lambda_i$ for a channel j is found, then assigning that channel to the user $u_i$ that ensures the condition $q_{i,j}/q_{i',j} > \lambda_i/\lambda_{i'}$, $\forall i' \ne i$; and if $q_{i,j} > \lambda_i$, $\forall i$, then leaving channel j unassigned.

2. The method of claim 1, according to which the inverse channel quality parameter $q_{i,j}$ for user $u_i$ and channel j is defined as $q_{i,j} = \sigma_{i,j}^2/G_{i,j}$, where $G_{i,j}$ is the channel gain and the receiver noise and interference power in the receiver is $\sigma_{i,j}^2$.

3. The method of claim 1, according to which the output power for the first transmitter to one of said first $u_1$ and second $u_2$ receivers on channel j is also determined, using $q_{i,j}$ and a set of Lagrange parameters $\lambda_i$.

4. The method of claim 3, according to which, for channel j and the user i of that channel, the power level $P_{i,j}$ is chosen as $P_{i,j} = \lambda_i - q_{i,j}$.

5. The method of claim 4, according to which the set of Lagrange parameters is user specific for user $u_i$.

6. The method of claim 1, according to which the rate for the first transmitter to one of said first $u_1$ and second $u_2$ receivers on channel j is also determined, using $q_{i,j}$ and a set of Lagrange parameters $\lambda_i$.

7. The method of claim 6, according to which the rate for the transmitter to a user i on channel j is determined as $\log_2(1 + p_{i,j}/q_{i,j})$.

8. A transmitter for use in a wireless communications system in which there is at least a first and a second receiver as at least two users, said transmitter being configured for transmitting on at least a first and a second channel to transmit to said at least two users on, and said transmitter including a control circuit configured for using at least two parameters lambda_i ($\lambda_i$) and further configured to:
- define a parameter $q_{i,j}$, which represents the inverse channel quality for user $u_i$ and channel j;
- set lambda_i to be proportional to q_i, i.e., $\lambda_i = x\_i * E(q\_i)$, where x_i is a fixed or slowly changing parameter for user i;
- finding all channels for user $u_i$ such that $q_{i,j} \leq \lambda_i$ but $q_{i',j} > \lambda_{i'}$, $\forall i' \neq i$, and designating those channels to user $u_i$;
- if more than one user $u_i$ with $q_{i,j} \leq \lambda_i$ for a channel j is found, then assign that channel to the user $u_i$, which ensures the condition $q_{i,j}/q_{i',j} > \lambda_i/\lambda_{i'}$, $\forall i' \neq i$; and
- if $q_{i,j} > \lambda_i$, $\forall i$, leaving channel j unassigned.

9. The transmitter of claim 8, in which the control circuit define the inverse channel quality parameter $q_{i,j}$ for user $u_i$ and channel j as $q_{i,j} = \sigma_{i,j}^2/G_{i,j}$, where $G_{i,j}$ is the channel gain and the receiver noise and interference power in the receiver is $\sigma_{i,j}^2$.

10. The transmitter of claim 8, in which the control circuit is configured to determine the output power for the first transmitter to one of said first $u_1$ and second $u_2$ receivers on channel j using $q_{i,j}$ and a set of Lagrange parameters $\lambda_i$.

11. The transmitter of claim 10, in which the control circuit, for channel j and the user i of that channel, chooses the power level $P_{i,j}$ as $P_{i,j} = \lambda_i - q_{i,j}$.

12. The transmitter of claim 10, in which the control circuit is configured to use a set of Lagrange parameters which is user specific for user $u_i$.

13. The transmitter of claim 8, in which control circuit is configured to determine the rate for the transmitter to one of said first $u_1$ and second $u_2$ receivers on channel j, using $q_{i,j}$ and a set of Lagrange parameters $\lambda_i$.

14. The transmitter of claim 13, in which the rate for the transmitter to a user i on channel j is determined by the control circuit as $\log_2(1 + p_{i,j}/q_{i,j})$.

* * * * *

UNITED STATES PATENT AND TRADEMARK OFFICE
CERTIFICATE OF CORRECTION

PATENT NO. : 8,200,266 B2
APPLICATION NO. : 12/666986
DATED : June 12, 2012
INVENTOR(S) : Larsson et al.

Page 1 of 2

It is certified that error appears in the above-identified patent and that said Letters Patent is hereby corrected as shown below:

On the Face Page, in Field (75), under "Inventors", in Column 1, Line 2,
delete "Ronninge" and insert -- Rönninge --, therefor.

On the Face Page, in Field (57), under "ABSTRACT", in Column 2, Line 6, delete "$q_{i\,j}$," and insert -- $q_{i,\,j}$ --, therefor.

On the Face Page, in Field (57), under "ABSTRACT", in Column 2, Line 7, delete "$u_i$," and insert -- $u_i$ --, therefor.

On the Face Page, in Field (57), under "ABSTRACT", in Column 2, Line 8, delete "$u_i$, such that $q_{ij} \leq \lambda_i$, but $q_{i'j} > \lambda$, $V_{i'} \neq i$," and insert -- $u_i$ such that $q_{i,j} \leq \lambda_i$ but $q_{i'j} > \lambda_{i'}$, $\forall i' \neq i$, --, therefor.

On the Face Page, in Field (57), under "ABSTRACT", in Column 2, Line 9, delete "u," and insert -- $u_i$. --, therefor.

On the Face Page, in Field (57), under "ABSTRACT", in Column 2, Lines 9-10,
delete "u, with $q_{i'j} < \lambda$" and insert -- $u_i$ with $q_{i,j} \leq \lambda_i$ --, therefor.

On the Face Page, in Field (57), under "ABSTRACT", in Column 2, Line 11, delete "$u_i$," and insert -- $u_i$ --, therefor.

On the Face Page, in Field (57), under "ABSTRACT", in Column 2, Lines 11-12,
delete "$q_{i\,j}/qr_j$, $> \lambda_i/\lambda_{i'}$, $V_{i'} \neq i$. If $q_{i\,j} > \lambda_i$, $V_i$" and insert -- $q_{i,j}/q_{i'j}, > \lambda_i/\lambda_{i'}$, $\forall i' \neq i$. If $q_{i,j} > \lambda_i$, $\forall i$, --, therefor.

In Column 4, Line 46, delete "$u_i$;" and insert -- $u_i$ --, therefor.

In Column 5, Line 24, delete "levels and/or" and insert -- levels $P_{i,j}$ and/or --, therefor.

Signed and Sealed this
Twentieth Day of November, 2012

David J. Kappos
*Director of the United States Patent and Trademark Office*

CERTIFICATE OF CORRECTION (continued)
U.S. Pat. No. 8,200,266 B2

In Column 6, Line 14, delete "$\neq 0, \forall i$'" and insert -- $=0, \forall i'$ --, therefor.

In Column 6, Line 15, delete "$\neq 0, \forall i$'" and insert -- $=0, \forall i'$ --, therefor.

In Column 10, Line 19, delete "$\overline{\mu}_j \overline{P}_j = 0,$" and insert -- $\overline{\mu}_j \overline{P}_j = 0,$ --, therefor.